United States Patent
Kivela

[11] 3,876,015
[45] Apr. 8, 1975

[54] POWER TOOL ATTACHMENT
[76] Inventor: Stanley E. Kivela, Rt. 1, Box 94, Marengo, Wis. 54855
[22] Filed: Feb. 11, 1971
[21] Appl. No.: 114,657

Related U.S. Application Data
[62] Division of Ser. No. 676,597, Oct. 19, 1967, Pat. No. 3,585,719.

[52] U.S. Cl. .................. 173/170; 30/392; 30/500; 144/35; 173/29
[51] Int. Cl. .......................................... B23d 51/10
[58] Field of Search .......... 173/170, 171, 123, 163, 173/29, 46; 310/50; 30/500, 392; 144/35 A, 27; 74/55–59

[56] References Cited
UNITED STATES PATENTS

| | | | |
|---|---|---|---|
| 2,501,542 | 3/1950 | Sheldon | 173/123 X |
| 2,548,411 | 4/1951 | Vache | 74/57 |
| 2,726,689 | 12/1955 | Busby | 310/50 U X |
| 3,039,502 | 6/1962 | Spivey | 144/35 A X |
| 3,068,917 | 12/1962 | Sundby | 144/27 |

Primary Examiner—Ernest R. Purser

[57] ABSTRACT

As part of an attachment that converts rotary to reciprocating action for portable power tools, such as electric hand drills, a method for selecting the most advantageous axial relationship between the attachment and the power tool and securing it in that selected position for using. The attachment remains secured to the power shaft of the power tool during the selecting of any position. The rear of the attachment has a flat surface perpendicular to the longitudinal axis of the tool and attachment. This flat surface is in sliding contact with a similar surface affixed to/ or part of the tool with securing and locking members adjacent to the periphery of the two flat surfaces or by bolt or bolts there through securing the two surfaces in the selected attitude permitting the user to maintain the most comfortable and safe grip on the tool and attachment.

6 Claims, 6 Drawing Figures

PATENTED APR 8 1975　　3,876,015
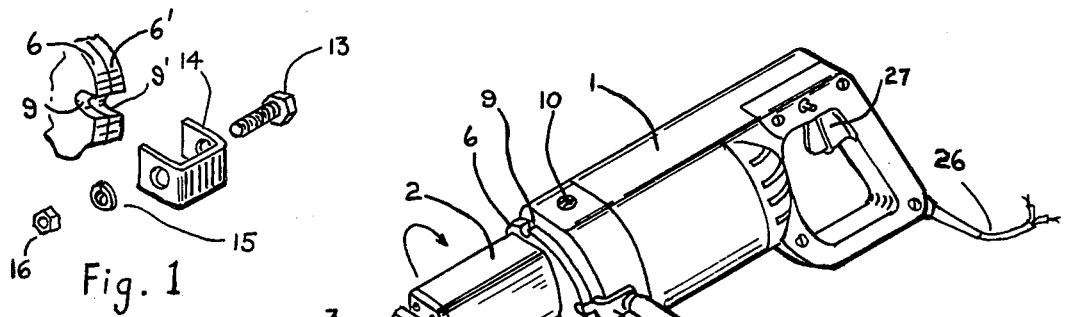
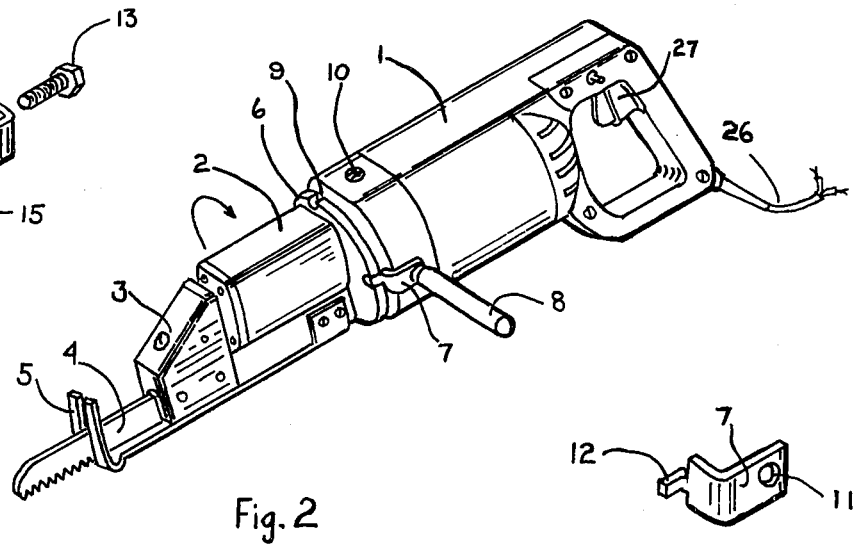
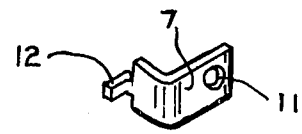
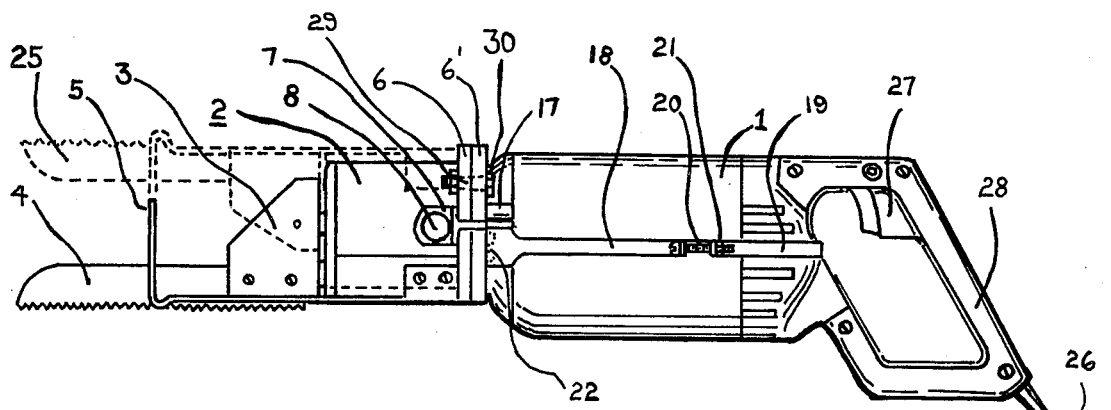
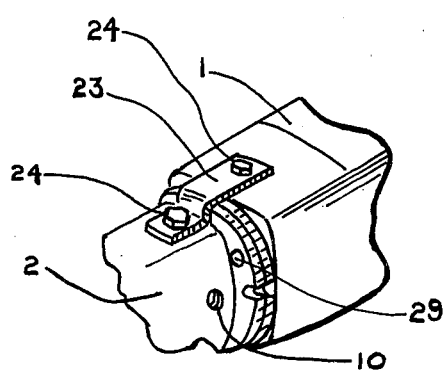
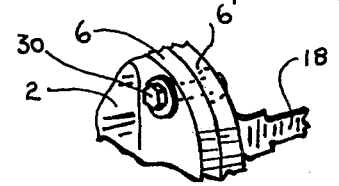
Stanley E. Kivela
INVENTOR.
BY

POWER TOOL ATTACHMENT

This is a divisional application of application Ser. No. 676,597, filed Oct. 19, 1967 and now 3,585,719 which concerned itself with the reciprocating tool features. This divisional application concerns itself with the rotating and securing of the reciprocating tool attachment to a selected axial relationship to the tool using a supportlock plate securable to a power tool housing, or a tool with support-lock plate surface manufactered as an integral part of the front of the power tool.

BACKGROUND OF INVENTION

There are, as known to the applicant, a number of reciprocating saws such as those known as sabre saws and industrial types that are used by contractors such as plumbers for cutting rough in openings, by heating-ventilating installers for cutting openings for registers, and by electricians.

References show a number of attachments with reciprocating means that are intended for securing to power tools. As shown and disclosed, most would require a special power tool for securing the attachment thereto with the front portion of the tool especially shaped to readily receive the attachment.

My invention is especially suited to securing to the usual configuration of portable electric drills as are on the market today. The anti-torque-lock plate can be secured to the body housing of the tool in a number of ways. The attachment is threadably or otherwise semi-permanently secured to the tool's usual front projecting rotating power spindle. It slidably abuts the mentioned lock plate. The tool can be rotated 360° in relation to the body housing of the tool while still secured to the power shaft of the tool. This allows the user to maintain his usual upright, most comfortable, and most safe grip on the power tool and the attachment rotated and fixed in position according to the situation encountered.

SUMMARY OF INVENTION

The purpose of this invention is to provide an adapter lock-plate securable to the usual configuration of drills available on the market today. Also, the lock-plate can be manufactured as part of the power tool front housing surface.

This lock-plate will have an aperture that will register and be in contact with the usual gear boss on the drill's front or at least part of the front housing adjacent to the projecting power shaft of the drill and further, permit the lock-plate to repose at perpindicular to longitudinal axis of the power shaft when thus held in contact thereon. Further rigidity and the securing to the tool thereof of this plate is accomplished in various ways, such as attachment-support members projecting rearwardly from the lock plate's surface and threadably secured to existing threaded holes of the drill, or possibly, an extra hole or holes drilled an tapped into the usual reduction gear housing.

Another means is to provide a strap, secured to the rear surface of the adapter lock-plate with the two ends secured at points essentially 180° apart. With the strap or straps then extending rearwardlly, going around the rear of the tool and a bolt clamp means for tightening the strap and holding the plate against the front surface of the tool.

A coinciding plate is mfg. as an operable part of the reciprocating attachment. With the adapter lock-plate secured to the power tool the attachment is secured on onto the spindle of the power tool with the rear surface of the attachment then in slidable contact with the adapter lock-plate surface secured to or part of the tool.

The attachment is rotatable 360° while still secured onto the power spindle of the tool. At 90° intervals, notches in the periphery of the two surfaces coincide, to permit the interposition of a locking clip or latch secured to either the attachment or the tool with one end of the latch or clip to repose within the aforementioned notches that are aligned at a selected position and thus fixing the axial relationship of the attachment to the tool.

There can also be holes drilled thru the two plates so that these holes register with each other at 90° intervals permitting a bolt to be inserted therethru, tightened and thus securing and locking the two surfaces to a selected axial relationship as to one another. It can also be pointed out that additional positions at 45° could be supplied and selected if advantageous to the use of this invention.

Thus when in use, the user has convenient and almost instant selection of a preferred position for the cutting direction of the tool in relationship to his grip on the tool. He does not have to disassemble and reassemble, merely unlocking, selecting position, and re securing the locking means without leaving job site or even changing positions, as when in cramped quarters, or where inconvenient as when under a car (muffler removal) and similar situations.

BRIEF DESCRIPTION OF THE DRAWINGS

FIG. 1 —This shows a U shaped clip that has holes thru the free ends thereof registering in alignment with each other. This clip is slipped over the edges of the two plates with a bolt inserted there thru tightening it onto the edged surface of the two parts securing them in registry with one another.

FIG. 2—This shows a perspective of a power tool manufactured for the attachment with the front gear housing of the tool having a flat surface.

FIG. 3—This shows a lock clip that retains any two selected notches in the peripheral edges of the two surfaces aligned with each other. Only one notch used as in FIG. 2

FIG. 4—This is an elevation of a power tool with an adapter lockplate secured thereto and the attachment secured to the power spindle of the tool and a dotted line "ghost view" outline of the attachment if attachment was rotated 180° and secured as if for upward cutting.

FIG. 5—This is a perspective of a strap secured to tool and attachment for affixing the two in relationship to each other.

FIG. 6—This is a partial perspective showing a bolt securing the two plates in relationship to each other being threaded thru holes registering with each other at a plurality of selected positions.

Like numbers refer to like parts in the various views.

DETAILED DESCRIPTION OF THE INVENTION

For descriptive purposes I shall have, as illustrated, this invention secured to a portable electric drill.

Referring to FIG. 1,,which is a partial perspective of the periphery of the two adjacent lock plates, one 6' being secured to or part of, the tool 1. It shows the other, abutting plate 6 secured to, or part of, the attachment 2. It also shows two notches, 9 and 9' in the peripheral edges of the plates aligned. To secure these in registry with each other, a U shaped clip 14 with two aligned holes in the free ends with a bolt 13 capable of being inserted there thru and secured therein by a lock washer 15 and nut 16. This assembly is then inserted into notches 9 and 9' and nut 16 tightened, securing clip into the aligned notches.

FIG. 2 shows in perspective, a power tool specifically manufactured for this attachment. This comprises the main tool 1, wity a switch 27, and a power cord 26. The front of the tool is a flat surface perpindicular to the power shaft spindle of the tool. Rear surface structure 6 of the attachment 2 slidably abuts this when semi-permanently secured onto power spindle of tool 1 as by thread means. Rear surface structure 6 has disposed at its periphery a plurality of notches 9. Attachment 2 has a reciprocating tool holder 3, a saw blade 4, and a blade guard 5.

In the front cover of power tool 1 are a plurality of threaded holes 10. The attachment 2 is rotated on a spindle of tool to a selected position where notch 9 in rear part of 6 aligns with one of the holes 10. A latch clip 7 registers over a threaded hole with its other end registering with notch 9. An auxiliary handle in this instance is threadably engaged into tapped hole 10 thru clip 7 and when tightened down, retains clip 7 to tool 1 and keeps attachment 2 in a selected position as relates to tool. FIG. 3 is a separate perspective of latch clip 7. This comprises an essentially flat structural member curved as needed to fit over edge of power tool as in FIG. 2 which is accomplished with an essentially 90° bend. At one end it has an aperture 11. At a distance from the other end it has another essentially 90° reverse bend with a projecting end 12 that registers with a notch or notches as shown in FIGS. 2 and 4 in either plate 6 or 6' when aligned or plate 6 as in FIG. 2. As can be seen in FIG. 4 this same type of clip-latch is used except it is secured to attachment 2 with end 12 registering within aligned notches 9 and 9' of plates 6 and 6'.

It should be understood and obvious that latch-clip 7 can be retained in position by a cap or slotted screw if handle 8 is not desired and where the handle might be in the way as might be encountered in some situations. Also that various dimensions of clip 7 might be required as applied to a power tool manufactured for the attachment as in FIG. 2 or with a power tool separate adapter plate secured to is as in FIG. 4.

FIG. 4 shows in elevation, a power tool 1 with anhandle 28, an on-off switch 27 and a power cord 26. For economy of views a number of methods of securing adapter lock plate 6' to power tool 1 are shown in FIG. 4.

Plate 6' has an aperture designed to register with and fit over the usual spindle boos of a tool and/or with a portion of the front surface of the tool. It would be possible to manufacture as required. Various plates 6' specifically adapted to various drills on the market, or a template sheet as to how the opening in plate 6' might be filed to adapt to the user's tool. Various methods of securing plate 6' to tool 1 will now be considered.

There are a number of tools with machine screws fastening the front gear reduction housing to the tool body-paralell to the longitudinal axis of the power shaft of the tool. Plate 6' can have two holes drilled and countersunk into it to register with existing holes in the tool's front housing cover. In this instance, a tubular support member 17 is inserted between this hole in plate 6' and gear case and a longer counter sunk machine screw inserted thru the hole in plate 6' (not shown), thu support member 17 and thru gear case cover of tool 1 and threaded into an existing tapped hole in the main body of tool 1. Tightening this machine screw then secures the plate very rigidly to tool 1. In the usual drill available in this style there are at least two such existing holes for use by this method of mounting and securing adapter lock plate 6' to the tool 1.

Many variations of this are possible to secure plate 6' to existing threaded holes of a drill-tool 1.

Where the previously described method, or a variation thereof, cannot be used or adapted to any particular drill or tool a strap clamp can be used. Referring to FIG. 4, one part 18 is secured to the rear of plate 6' at 22. The other part of strap-clamp 19 is secured essentially 180° opposite, to the rear of plate 6' as at 22. The two free ends of this clamp have right angle bends with holes for bolt 20 and nut 21. This is then tightened until plate 6' registering over front of tool 1 is pulled into firm contact with the front of gear case cover of the tool 1.

The surface of the front of gear case cover is not perfectly concentric with the spindle on some drills and a plate 6' adapted to any such profile will be held in place very well by strap clamp means as described.

Another method of securing attachment 2 to tool 1 in relationship to each other is shown in FIG. 5. Here a strap 23 with holes at its ends registers with tapped holes in attachment 2 and tool 1. This strap is secured by two machine screws 24.

FIGS. 6 (and 4) show how a bolt 30 can be inserted thru matching holes 29 in plates 6 and 6' at a selected position, tightened, and thus secure tool 1 in a fixed position as respect to attachment 2.

Various modifications might be resorted to by those skilled in the art and it is not intended to limit this invention to the exact form as disclosed herein and in this application and all such modifications and any production technology variants as might occur are intended to fall within the spirit and scope of this invention as claimed.

What is claimed as new is:

1. An attachment for a hand power tool securable to the rotating power shaft of said tool, with an attachment capable of performing a useful function, wherein the improvement is a structure for allowing selection of, and fixing of, the axial relationship along a common longitudinal axis between said attachment and said tool while the tool remains secured to said attachment by its power shaft coupled to said attachment, said improvement comprising in combination;

a. a portable hand power tool with a rotating power shaft projecting outwardly forward from the front of said tool, a source of power, and a control means for said power.

b. an adapter lock plate with an essentially centrally located aperture of such configuration as to allow said plate to fit over at least a part of the front surface of said tool and to repose perpendicular to the longitudinal axis of said power shaft of said tool.

c. support and securing member means for said plate operably disposed between the rear surface of said plate (b) and the tool (a) with threaded screw means securing said support member means and said disc plate (b) to threaded holes in the front portion of said power tool (a) and thus securing said plate (b) to said tool.

d. an attachment for said tool capable of performing a useful function that is securable to the rotating power shaft of said tool and further, when said attachment is thus secured to said tool, said attachment having a rear exterior surface, flat, slidably abutting forward surface of said plate (b) allowing rotation of said attachment 360° on said power shaft, in relation to said tool when selecting a convenient axial relationship as may be required by user while said attachment is thus secured to said tool.

e. the two abutting surfaces of plate (b) and rear surface of said attachment (d) each having at their exterior peripheral edges, a series of notches, with these said notches registering with each other at a plurality of intervals as the said attachment is rotated to a selected position.

f. a clip-latch member means, securable to said attachment with its other end, registering with any aligned notches of (b) and (d) as set forth in (e) thus fixing the axial relationship between said tool and said attachment preventing torque reaction between said tool and said attachment from changing axial relationship of said tool to said attachment.

2. The invention of claim 1 wherein the slidably abutting surfaces of (b) and (d) have, adjacent to their peripheral enges, a plurality of holes drilled there thru with at least one hole of each, said (b) and (d), registering at a plurality of intervals when selecting a suitable axial relationship between said tool (a) and attachment (d) and bolt means insertable there thru securing and fixing the axial relationship between tool (a) and attachment (d).

3. The invention of claim 1 wherein clip latch member is securable to tool (a) and its other end registering with and reposing within the aligned notches of said (e) and (d) thus fixing axial relationship between tool (a) and attachment (d).

4. The invention of claim 1 wherein the adapter lock plate (b) is secured to tool (a) by a clamp strap secured at two points to rear surface of said plate and extending rearwardly from said plate (c) around the rear of said tool (a) and having tightening means to tighten said clamp and thus securing said plate (b) to tool (a).

5. The invention of claim 1 wherein the rear surface of said attachment slidably abuts the front surface of said tool with said attachment having a plurality of notches on the peripheral edge of said rear surface with a clip-latch means securable to said power tool with the other remaining end of said clip latch registering with and reposing within a selected notch of said rear surface peripheral edge of said attachment thus fixing the axial relationship between said attachment and said tool.

6. The invention of claim 1 wherein the structural members means (c) and clip latch means (f) comprises an essentially flat component with its ends registering with and over threaded holes in the said attachment and the said tool, securable there by threaded fastener means thus fixing the axial relationship between said attachment and said tool.

* * * * *